March 10, 1942.  H. KLAUE  2,276,206
AUTOMATICALLY ACTING ADJUSTING DEVICE FOR FRICTION BRAKES
Filed Nov. 13, 1939
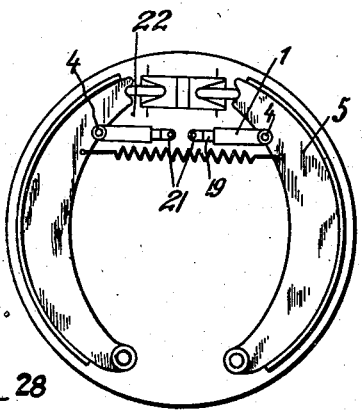
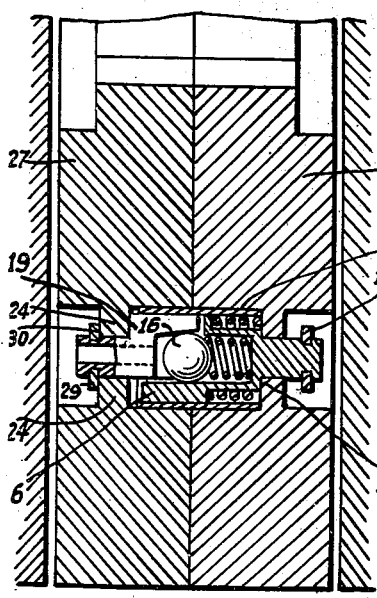
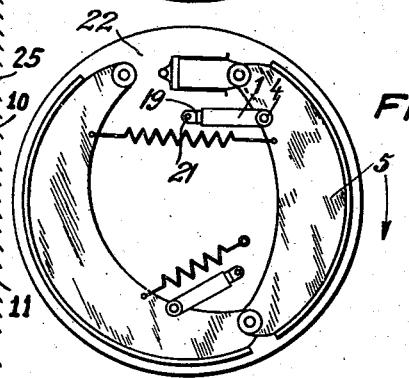
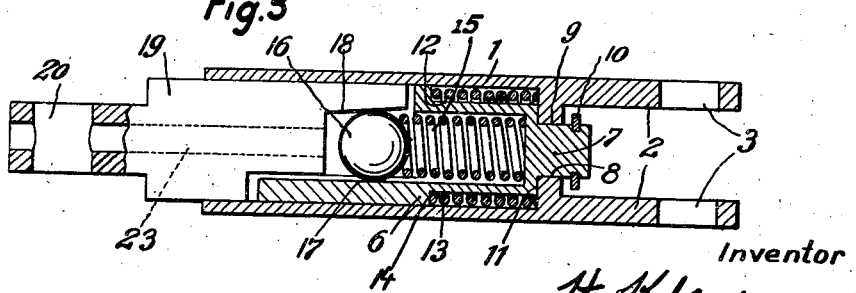
Inventor
H. Klaue
By E. F. Wendroth
Attorney Patented Mar. 10, 1942

2,276,206

UNITED STATES PATENT OFFICE 2,276,206

AUTOMATICALLY ACTING ADJUSTING DEVICE FOR FRICTION BRAKES

Hermann Klaue, Berlin-Frohnau, Germany

Application November 13, 1939, Serial No. 304,260
In Germany June 22, 1939

6 Claims. (Cl. 188—79.5)

The present invention relates to an automatically acting adjusting device for friction brakes.

The permanent progressive wear of the brake surfaces causes changes in the play between the brake members so that, upon increased wear, the brake members, on the brake being applied, must traverse a larger path than originally. This, however, causes disadvantages with regard to the permanent uniformity of braking so that preferably care is taken that always the same play is maintained between the brake surfaces regardless of the degree of wear of the latter.

The above stated object is obtained according to the present invention by the fact that the play between the brake surfaces necessary for applying and releasing the brake is limited by stops mounted upon a slide movably arranged with regard to said brake members, and a projection of the movable brake member slides during the braking action between said stops, the slide due to the pressure exerted, during braking, by the projection against the stop in consideration being pressed always into the position depending on the wear of the brake surfaces and maintained in this position by a clamping device.

In connection with brake checks, the projections of the movable brake member preferably are according to a further feature of the present invention arranged upon a sleeve pivoted to the brake cheek, said sleeve surrounding the slide and a clamping bolt pivoted to the brake shield in the manner of a sleeve.

In case of double acting disc brakes the arrangement according to the invention may be such that the clamping bolt otherwise linked to the brake shield is fixed to the second brake disc, the play limited by the projections of the slide allowing movement of both brake discs into the braking position.

The clamping device may preferably consist of a ball pressed against an inclined surface under the action of a spring bearing against the movable member.

Further details of the invention will be described by way of the accompanying drawing which illustrates the invention by way of example.

In the drawing:

Fig. 1 shows an adjusting device in connection with ordinary brake shoes,

Fig. 2 is a view similar to Fig. 1 illustrating the arrangement of an adjustable device in connection with a servo brake, Fig. 3 is a cross-section through an adjusting device suitable for brake cheeks, and Fig. 4 is a cross-section of the new device in connection with a double acting disc brake.

In the construction shown in Fig. 3 a sleeve 1 having a forked extension 2 provided with bores 3 is pivoted to a bolt 4 (Figs. 1 and 2) which extends through said bores 3. The bolt 4 is mounted on the brake cheek 5. Movably inserted in the sleeve 1 is a slide 6, an offset or reduced portion 7 of which extends through an opening 8 of the sleeve 1. The arrangement is such that by means of projections 9 forming the opening 8 the sleeve 1 may reciprocate between two stops formed by a ring 10 provided at the end of the offset or reduced portion 7 and a shoulder 11 of the slide 6.

In the periphery of the slide 6 a cylindrical recess 12 is provided into which a spring 13 is inserted. The ends of the spring 13 bear against the projections 9 of the sleeve 1 and the shoulders 14 of the slide 6 respectively.

The slide 6 is provided with a bore affording a space for the reception of a spring 15, one end of which bears against a ball 16. One half of the ball 16 slides upon an elongated portion 17 of the slide 6 and the other half bears against an inclined surface 18 provided on a clamping bolt 19. This clamping bolt 19 also is movably arranged with regard to the sleeve 1. A bore 20 provided in the clamping bolt 19 serves to pivot the latter to a bolt 21 which, as shown in Figs. 1 and 2, is fixed to the brake shield 22. For the purpose of facilitating the mounting of the device, the clamping bolt 19 is provided with a longitudinal bore 23.

The operation of the device described is as follows:

If during braking the brake cheek 5 is in a well known manner pressed against the brake drum, the sleeve 1 slides in accordance with the play between the stops 10 and 11 of the slide 6 towards the right (Fig. 3) provided that a substantial wear of the brake lining has not yet occurred. Due to the action of the spring 13 the relative position of the clamping bolt 19 and the slide 6 first of all remains unaltered. If, however, the brake linings have been worn to a substantial degree, i. e. if during braking the sleeve 1 is pressed for a longer distance towards the right than is in accordance with the play between the stops 10 and 11, the slide 6 is shifted together with the sleeve 1 towards the right relative to the clamping bolt 19 for a distance corresponding to the play due to the wear, whereupon the slide 6 and the sleeve 1 are fixed in this new position by the action of the springs 13 and 15 and the ball 16. The latter thereby correspondingly has been moved along the projection 17 of the slide 6.

Fig. 4 shows a double acting disc brake in its position of rest. Parts in Fig. 4 corresponding to those shown in Figs. 1 to 3 are designated with the same reference character. Shiftably arranged in the sleeve 25 fixed to the brake disc 26 are the slide 6 and the clamping bolt 19. The latter is fixed to the brake disc 27 by means of the annular disc or ring 29 in such a manner that the projections 24 of the disc 27 are clamped between the ring 29 and the shoulder 30 of the clamping bolt 19. The play limited by the stops 10, 11 allows a movement of both brake discs 27, 28 into the braking position. The operation of this device corresponds to that described in connection with Figs. 1 to 3.

Figs. 1 and 2 show the most preferred points of mounting the device according to the invention in connection with brake cheeks. If used in connection with a disc brake as shown in Fig. 4, the new device preferably is provided at three points of the periphery of the brake equally spaced from each other.

What I claim is:

1. An automatically acting adjusting device for friction brakes which includes a movable brake-pressure applying member and wherein a uniform play between the brake surfaces is constantly maintained, said device comprising a bolt member, a sleeve member secured to said movable member, a slide movably arranged between said bolt member and sleeve member, said sleeve member at least partially encompassing said slide and bolt member, stops on said slide, and means connected to said movable member and arranged intermediate said stops, the arrangement being such that upon applying the brakes said slide is pressed into a position depending upon the wear of the brake surfaces by the pressure of the means connected to said movable member against one of said stops, and clamping means cooperating with said bolt member for maintaining said slide in said position.

2. An automatically acting adjusting device for friction brakes which include a movable brake shield and a brake shoe, said device being adapted to constantly maintain a uniform play between the brake surfaces and comprising a bolt member secured to said brake shield against longitudinal movement, a movable sleeve member connected to said brake shoe, a slide movably arranged between said bolt member and said sleeve member, said sleeve member completely and movably encompassing said slide and telescopically encompassing said bolt member, means for entraining said slide after a predetermined period of movement of said sleeve member relative thereto, the arrangement being such that on applying the brake said slide is pressed into a position depending on the wear of the brake surfaces, and means arranged intermediate said slide and bolt member for clampingly maintaining the slide in said position.

3. An automatically acting adjusting device for friction brakes which include a movable brake shield and a brake shoe, said device being adapted to constantly maintain a uniform play between the brake surfaces and comprising a bolt member secured to said brake shield against longitudinal movement, a movable sleeve member connected to said brake shoe, a slide movably arranged between said bolt member and said sleeve member, said sleeve member completely and movably encompassing said slide and telescopically encompassing said bolt member, said slide member being provided with an exterior peripheral portion in the form of a groove defining spaced shoulders, said sleeve member being provided with a corresponding projection extending into said peripheral groove, the axial length of said projection being substantially less than the axial length of said groove, thereby providing means whereby said sleeve member entrains said slide after a predetermined movement of said sleeve member relative to said slide, the arrangement being such that on applying the brake said slide is pressed into a position depending on the wear of the brake surfaces, and means arranged intermediate said slide and bolt member for clampingly maintaining the slide in said position.

4. An automatically acting adjusting device for friction brakes which include double acting movable brake disks, said device being adapted to maintain a uniform play between the brake surfaces and comprising a bolt member secured to one of said brake disks against longitudinal movement relative thereto, a sleeve member connected to the other brake disk and movable therewith, a slide shiftably arranged between said bolt member and said sleeve member, said sleeve member encompassing said slide and telescopically encompassing said bolt member, means for entraining said slide after a predetermined period of movement of said other disk relative to the slide, the arrangement being such that on applying the brake said slide is pressed into a position depending on the wear of the brake surfaces, and means arranged intermediate said slide and bolt member for clampingly maintaining the slide in said position.

5. An automatically acting adjusting device for friction brakes which include double acting movable brake disks, said device being adapted to maintain a uniform play between the brake surfaces and comprising a bolt member secured to one of said brake disks against longitudinal movement relative thereto, a sleeve member connected to the other brake disk and movable therewith, a slide shiftably arranged between said bolt member and said sleeve member, said sleeve member encompassing said slide and telescopically encompassing said bolt member, said slide member being provided with an exterior peripheral portion in the form of a groove defining spaced shoulders, said other brake disk being provided with a corresponding projection extending into said peripheral groove, the axial length of said projection being substantially less than the axial length of said groove, thereby providing means whereby said other brake disk entrains said slide after a predetermined period of movement of said sleeve member relative to said slide, the arrangement being such that on applying the brake said slide is pressed into a position depending on the wear of the brake surfaces, and means arranged intermediate said slide and bolt member for clampingly maintaining the slide in said position.

6. An automatically acting adjusting device for friction brakes adapted to constantly maintain a uniform play between the brake surfaces, comprising a fixed member, a movable member, a slide movably arranged between said members, stops mounted on said slide, and a projection arranged on said movable member, the arrangement being such that on applying the brake said slide is pressed into a position depending upon the wear of the brake surfaces by the pressure of its projection against one of said stops, said fixed member being provided with an inclined surface, and clamping means for maintaining said slide in the aforesaid position, said clamping means including a ball member positioned between said slide and said inclined surface and spring means pressing said ball member against said surface.

HERMANN KLAUE.